United States Patent
Eckhoff

[11] Patent Number: 6,096,379
[45] Date of Patent: Aug. 1, 2000

[54] RADIATION PROCESSING APPARATUS AND METHOD

[76] Inventor: Paul S. Eckhoff, 506 Rte. 25, Stuyvesant, N.Y. 12173

[21] Appl. No.: 09/270,349

[22] Filed: Mar. 16, 1999

Related U.S. Application Data

[63] Continuation-in-part of application No. 09/045,197, Mar. 20, 1998, Pat. No. 5,882,737.
[51] Int. Cl.⁷ ........................................ B05D 1/28
[52] U.S. Cl. ............................................ 427/428
[58] Field of Search ................................ 427/487

[56] References Cited

U.S. PATENT DOCUMENTS 3,766,031 10/1973 Dillon .
4,748,005 5/1988 Neuberg et al. .
4,777,192 10/1988 Neuberg et al. .
4,998,486 3/1991 Dighe et al. .

*Primary Examiner*—Terressa M. Boykin
*Attorney, Agent, or Firm*—Jay R. Yablon

[57] ABSTRACT

A method and apparatus for the continuous feeding of polymer chips or particles to an electron beam accelerator makes use of spreading, belt conveying, irradiation and cooling. The apparatus is designed to make more efficient use of radiation through continuous feed. This method and apparatus, suitably adapted, is also used for food irradiation and decontamination, particularly for ground meats.

26 Claims, 8 Drawing Sheets

RADIATION PROCESSING APPARATUS AND METHOD

CROSS-REFERENCE TO RELATED APPLICATIONS

This application is a continuation-in-part of application Ser. No. 09/045,197, filed Mar. 20, 1998, now U.S. Pat. No. 5,882,737, issued Mar. 16, 1999.

FIELD OF THE INVENTION

This invention relates to continuous radiation treatment for cross linking and degradation of polymers including but not limited to cross linking of polytetrafluorethylene (PTFE), as well to similar radiation treatment for meat decontamination.

BACKGROUND OF THE INVENTION

The purpose of radiation crosslinking for solid polymers is to facilitate air fluidized bed grinding of the subject polymer to a fine powder. Many polymers, including PTFE, can only be ground by using an air jet mill in fluidized bed form. The more uniform the radiation dosage, the faster grinding can proceed. In addition, irradiation is most efficient if the polymer temperature during irradiation can be maintained below a predetermined maximum temperature.

The methods currently in practice to irradiate polymers including but not limited to polytetrafluorethylene (PTFE), are batch processes, which are slow and result in non-uniform irradiation and cooling. Dillon (U.S. Pat. No. 3,766,031) teaches the use of trays containing chips which make multiple passes under a radiation beam. Multiple passes reduce problems of heat and discoloration of the polymer. But despite the use of multiple passes, this tray method is slow and inefficient, and results in some non-uniform irradiation and cooling.

Neuberg and Luniewski (U.S. Pat. Nos. 4,477,192 and 4,748,005) teach the use of a ribbon blender for irradiation. This is also a batch process employing a single charge of chips placed into a water-jacketed ribbon blender wherein agitation for periods up to eight hours is relied upon for surface exposure to the electron beam. The ribbon blender method is slow and inefficient because of time consumed in loading and unloading the blender. Further, because it is common to process recycled PTFE scrap from numerous sources where the specifications, including density, vary widely, the radiation dosage is non-uniformly applied, particularly where the polymer chips are of differing densities and heavier chips tend to seek the bottom of the blender and resist complete agitation. The ribbon blender method also suffers from only random exposure of chips to the cooling surface of the blender shell, and thus, non-uniform cooling.

In short, the prior art methods are slow, chips are not uniformly radiated, and they are not uniformly cooled.

Additionally, there have been a number of instances in which people have become ill or even died from consuming contaminated meats. It is well known that irradiation of meats (as well as other food products) can be used to effectively kill the bacteria causing contamination, and can thus save lives.

Since direct human exposure to radiation is of course to be avoided, any food irradiation must take place in a sealed area which effectively contains the radiation. The most efficient way to achieve this is through automated means for delivering the food to the irradiation means, so that direct human intervention, and the associated shutdown and startup time, is not required. Thus, the large-scale application of irradiation to food sterilization requires an apparatus and method to deliver large quantities of the food to be irradiated, to the radiation means, without direct human intervention, on a continuous basis.

OBJECTS OF THE INVENTION

It is an object of the present invention to provide an apparatus and method for faster and more uniform production of irradiated chip polymers and faster air grinding.

In particular, it is an object of this invention to enable polymer chips to be uniformly irradiated, while being uniformly cooled to optimum temperature.

It is a further object of this invention to enable polymer irradiation to be performed more rapidly than is enabled by the prior art.

It is a further object of the invention to enable automated radiation of large quantities of food, particularly meats.

It is a further object of the invention to easily adapt the apparatus and method employed for polymer irradiation, to the irradiation of food.

SUMMARY OF THE INVENTION

There is provided an apparatus and method for continuous feeding, radiation, cross linking and processing of polymer chips so that they may be further processed into fine powder. PTFE is one polymer that is suitably processed by this apparatus and method, though the apparatus and method work equally well for any solid polymer for which further cross-linking is desired. In its preferred embodiment, the apparatus includes a chip supply, feed auger, a hopper for holding chips, a rotary spreader, spreader bar for depth control, an endless stainless steel belt conveyor, a cooling means with non-contact coolant sprays under the conveyor, the electron beam accelerator and a chip collection hopper at the end of the conveyor.

The apparatus and method for continuous feeding, radiation, cross linking and processing of polymer chips, is also readily adapted to the irradiation of food such as meats. The chip supply is simply replaced by a suitable food supply, and means are provided for uniformly distributing the food to enable optimum irradiation.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1:
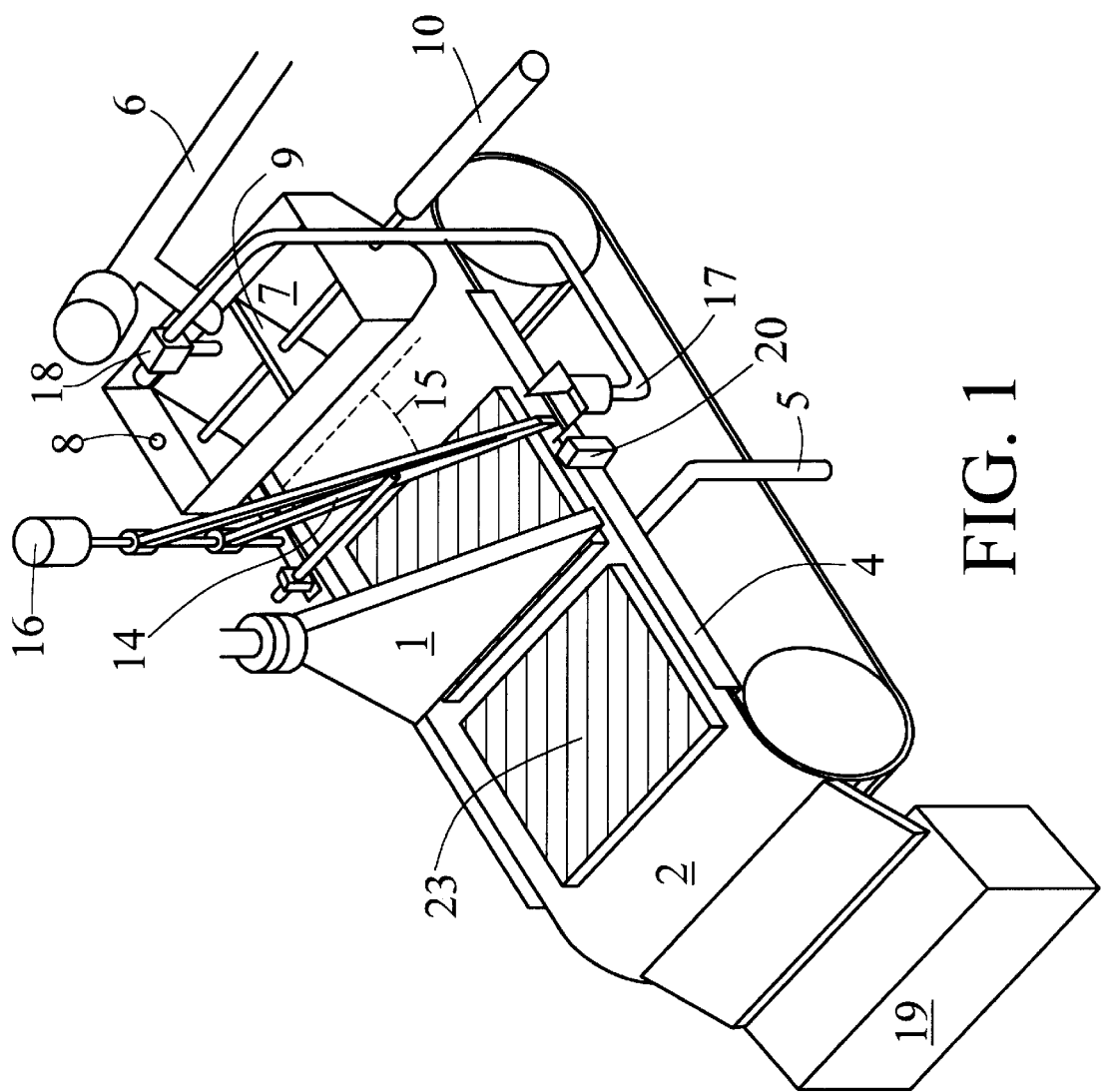
FIG. 1 is a perspective view showing the auger feed, feed hopper, rotary spreader, spreader bar and belt.
Figure 2:
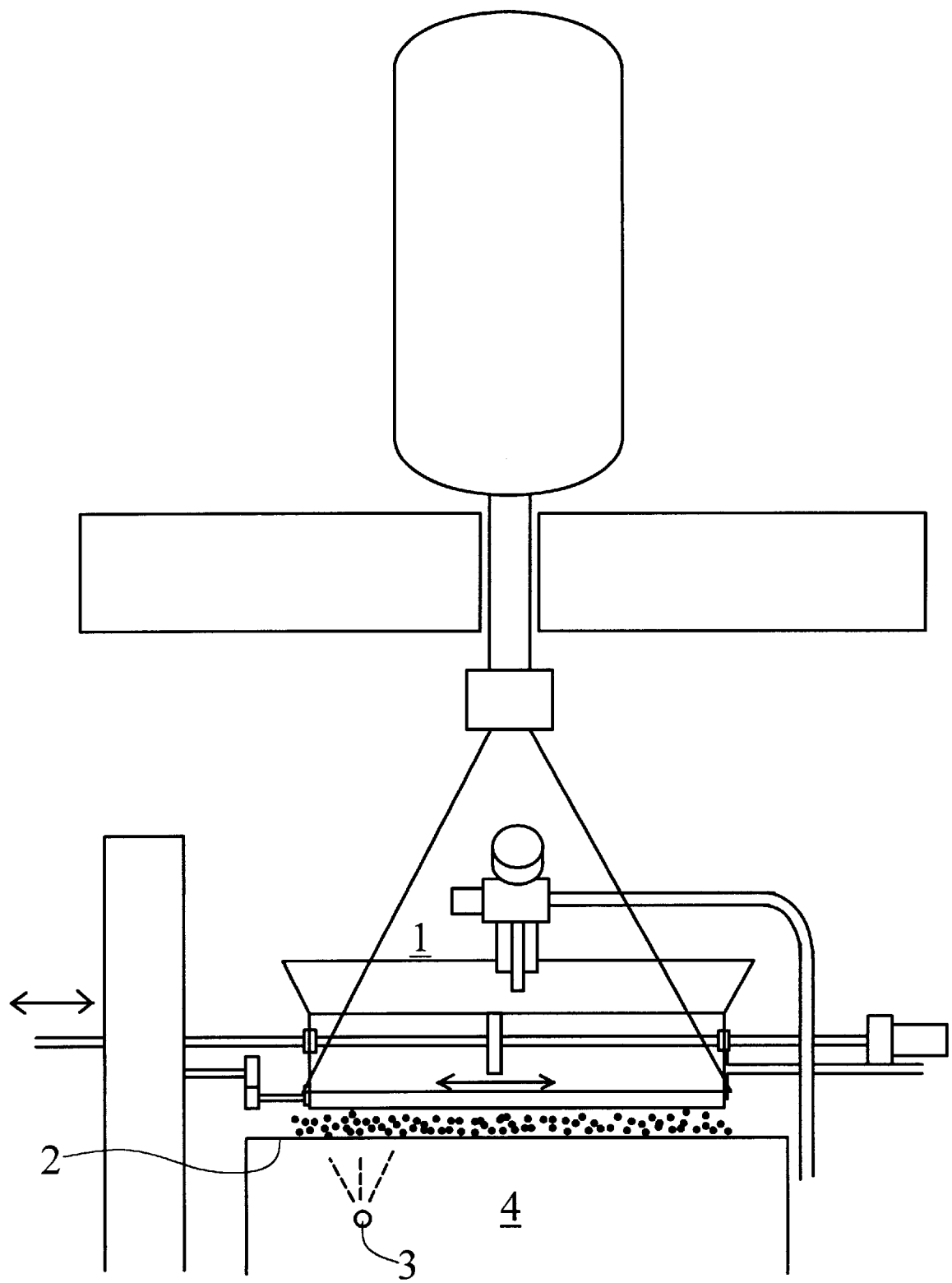
FIG. 2 is an end view of a material processing apparatus in accordance with an embodiment of the invention.

FIGS. 1 and 2, respectively, are perspective and end views of an apparatus for processing material in accordance with the present invention. The apparatus is useful for radiation cross linking of polymers in order to render a polymer, particularly PTFE, suitable for air grinding into fine powder. In the form of powder PTFE has many uses ranging from frying pans to lubricants.

The apparatus is located within a masonry vault (not shown) to contain ozone and stray radiation, and both the inlet to the system and the outlet are isolated from areas occupied by personnel by means of rotary iron valves (not shown), known commercially as "Rotoloks."

Unradiated chips are fed by auger 6 into chip feed hopper 7, passing over a magnetic separator (not shown) to remove undesired "tramp iron." A hopper level sensor 8 for detecting when the chips have reached a certain level, controls the motor of auger feed 6 so as to prevent overflowing feed hopper 7. This level sensor may be a photocell, or any other suitable device known in the art for the purpose of detecting when a material (such as chips) has accumulated to a certain level. Because chips sometimes bridge and stop flowing, a vibrating commercial air jet (not shown) is added to each side of feed hopper 7 to facilitate flow. In a preferred embodiment, the width of feed hopper 7 is approximately four feet, though it can be any size greater than approximately one foot, limited only by the size of the vault containing the apparatus.

Figure 3:
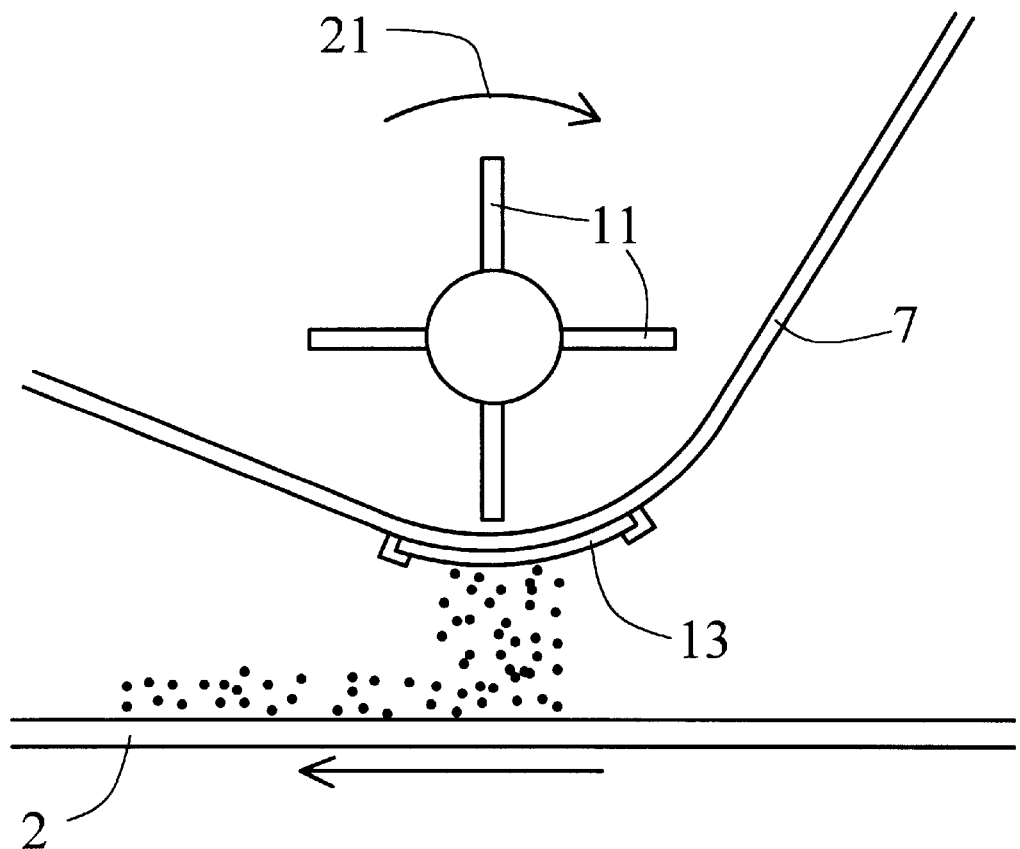
FIG. 3 is a side view of the rotary scraper and spreader slide.

To more evenly distribute incoming chips throughout feed hopper 7, a hopper chip leveler 9 is added with a linear actuator 10. Hopper chip leveler 9 moves back and forth horizontally, controlled through actuator 10 by a timer (not shown). At the base of feed hopper 7 are motorized rotary scraper blades 11 running the full length of feed hopper 7. These are not visible in the perspective view of FIG. 1, but are shown in side view FIG. 3. Also, feed hopper 7 preferably has a sloping entry side of about sixty degrees relative to horizontal, as depicted, which contains the earlier-referenced magnetic separator. This angle, however, can range anywhere from thirty to eighty degrees. The bottom of the hopper has a rounded "v" bottom, as also depicted.

To deposit the chips from the feed hopper 7 onto moving "endless" conveyor belt 2, scraper blades 11 rotate as depicted by clockwise arrow 21 (though a counterclockwise direction is also suitable), so as to facilitate chip flow through hopper apertures 12 (see FIG. 4) in the bottom of feed hopper 7. The volume/rate of chip flow through hopper apertures 12 is regulated by flow rate slide 13, which has slide apertures 22 that are substantially the same size as the hopper apertures 12. Both the hopper and slide apertures 12 and 22 are typically ½ inch in diameter, though any diameter ranging from ⅛ inch to ¾ inches is acceptable. Preferred spacing between apertures is about ¾", and generally, about 150% of the aperture diameter, though variations between 100% and 300% of diameter are acceptable. Slide 13 moves by a linear actuator (not shown) to fully or partially align apertures 12 and 22, thereby providing full or partial flow along a continuous range of available flow rates, as desired.

This spreader assembly described this far deposits discreet streams of chips on moving conveyor belt 2, which is preferably made of stainless steel or other suitable material as further described below. The speed of the belt is variable along a continuous ranges of speed anywhere from 1 foot per minute to 10 feet per minute. In the preferred embodiment the belt is five feet wide and travels four feet per minute, while the chip stream is four feet wide (as a result of the four foot wide feed hopper 7). The belt can, however, can be of any width greater than about two feet, with upper limit imposed only by the size of the vault containing the belt. A preferred length for the processing surface of the belt is about 12 feet, though this is simply exemplary, and not limiting. Any length of belt used in combination with the overall devices and methods taught herein is considered within the scope of this disclosure and its associated claims.

To convert the chip stream to an even, uniform chip bed 23 for uniform irradiation, leveling means 14 such as the illustrated chip bed leveling bar is positioned at an adjustable angle 15 relative to the width of the chip bed. In a preferred embodiment, this angle 15 is between 30 and 45 degrees, though it may vary anywhere from 20 to 60 degrees, and can even be as small as zero degrees. The chosen angle is locked by a set screw (not shown), or may be locked by any other suitable angle locking means for fixing leveling means 14 at a set, predetermined angle. The depth of chip bed 23 is monitored by a chip bed level sensor 20, such as a photo cell/light source or similar suitable sensing device known in the art. In response to chip bed level sensor 20, the height of chip bed leveling bar 14 above belt 2 is controlled by leveling bar height adjustment means 16, such as, but not limited to, a motorized screw. In preferred operational mode, bar 14 will be set at approximately ⅜ inch above belt 2 so as to form an approximately ⅜ inch deep chip bed 23. But this can be varied anywhere from ⅛ inch to 1 inch depending upon the quality and size of the chips, and upon the amount of radiation required. Excess chips fall off the side of conveyor belt 2 and are collected in overflow collector hopper 17 and returned to feed hopper 7, in a preferred embodiment, by vacuum return means 18. In an alternative embodiment, the conveyor belt 2 is subjected to vibrations, which operate as the leveling means causing the chips to distribute into the desired substantially uniform chip bed.

After about four feet of belt travel which, in the preferred embodiment, takes about one minute, flow rate slide 13 closes all of hopper apertures 12 to stop flow of additional chips from hopper feed 7 onto belt 2. The closing cycle is controlled by a programmable timer, not shown. The bed of chips then passes beneath electron beam accelerator (EBA) scan horn 1, or other suitable radiation means, for a preferred distance of four feet. The exact distance is controlled by a programmable sensor such as a precision timer (not shown). The direction of belt flow may then be reversed for a second pass under scan horn 1. After the second pass, belt 2 may reverse direction again, for a third pass. While three passes are used in the preferred embodiment, this device may be programmed to employ any desired number of passes suitable to the proper radiation processing of the polymer chip material being processed. While the length of chip bed 23 is approximately four feet in the preferred embodiment, this length can be as small as two feet, and is limited at the upper end only by the overall length of belt 2, which in turn is limited only by the size of the containing vault.

Because the irradiation of the chips generates significant heat, and because proper processing requires the chips to be maintained below a predetermined maximum temperature, coolant jets 3 in coolant chamber 4 (see FIG. 2) constantly spray the underside of belt 2 to maintain a chip temperature below the maximum temperature, throughout the process cycle, providing a means to cool the chips during irradiation. In the preferred embodiment, for the processing of PTFE chips, this maximum temperature is approximately 400 degrees Fahrenheit. Also, in the preferred embodiment, the coolant is water. Coolant, once sprayed, is collected in coolant chamber 4 so as to exit through coolant drain 5, to be recycled through a heat exchanger and PH control unit (not shown) to maintain a PH of approximately 7.

For three-pass operation, flow rate slide 13 reopens for the next cycle of chip irradiation, simultaneously with the start of the third pass for the prior cycle of irradiation. After three passes (for three-pass operation), the processed chips in chip bed 23 are discharged off the end of belt 2 into irradiated chip collector 19, while the next bed of chips is ready for irradiation. By screw feed or similar means (not shown) the processed chips are fed to a blow-through Rotolok rotary valve and then conveyed out of the vault to a receiving silo by means of a blower (not shown). By having Rotoloks at both the entrance and exit from the vault, the process and any emissions are contained in the vault.

The substantial flatness and uniform distribution of chip bed 23, as well as the precise control gained by moving chip bed 23 upon conveyor belt 2 under scan horn 1, results in a substantially uniform irradiation of all the polymer chips. The above, combined with coolant jets 3 spraying the underside of belt 2, also results in substantially uniform chip cooling.

As noted above, conveyor belt 2 is preferably made of stainless steel. This is because stainless steel will not become damaged by repeated irradiation exposure over time, can be fabricated into a form that is flexible enough to form an "endless" conveyor belt such as belt 2, and is highly-conductive of heat which therefore facilitates cooling by the coolant jets 3 located under the belt 2. Any material with similar characteristics may effectively be substituted for stainless steel within the scope of this invention.

The interrelationships among various parameters of this apparatus and method should also be noted. For example, the speed at which chip bed 23 is moved past scanner horn 1, the number of passes, the length and depth of chip bed 23, the strength of the radiation, and the heat-exchange capacity of the coolant, can all be adjusted depending upon the particular type of polymer to be processed, the quality and size of the polymer chips, the degree of radiation needed, and the desired maximum temperature. Thus, for example, a slower conveyance speed will tend to heat the polymer more rapidly, which in turn may increase the cooling requirements. Similarly, for a deeper chip bed, there will be more variation between the chip temperature higher in the bed and lower in the bed, since the lower chips will be in closer contact with the coolant on the underside of the belt. Or, a particular situation may demand more passes with greater conveyance speed so as to avoid too much polymer heating, or may admit fewer passes with slower speed. In short, it is to be understood that processing situations may vary from one another, and that the parameters for speed, number of passes, bed length, bed depth, coolant type, etc., can be varied in an interrelated manner so as to meet the particular processing requirements. Thus, the various ranges for these parameters outlined herein are simply guidelines that can be adjusted as needed within the spirit of this invention.

It should also be noted that while the conveyor belt 2 provides the chip movement and all other components of the invention remain in fixed position, an obvious variation would be to replace the conveyor belt 2 with an immobile platform, and to have all other components of the invention (i.e., hopper 7, scan horn 1, coolant jets 3, etc. move with respect to the fixed platform.) While more cumbersome and less preferred, such a variation is encompassed by this disclosure and its associated claims.

This invention has applicability to polymer irradiation generally, and particularly to PTFE irradiation, so as to facilitate subsequent air fluidized bed grinding of the subject polymer to a fine powder. But it can be used for any solid polymer in need of additional cross linking, including virgin or scrap PTFE.

Figure 4:
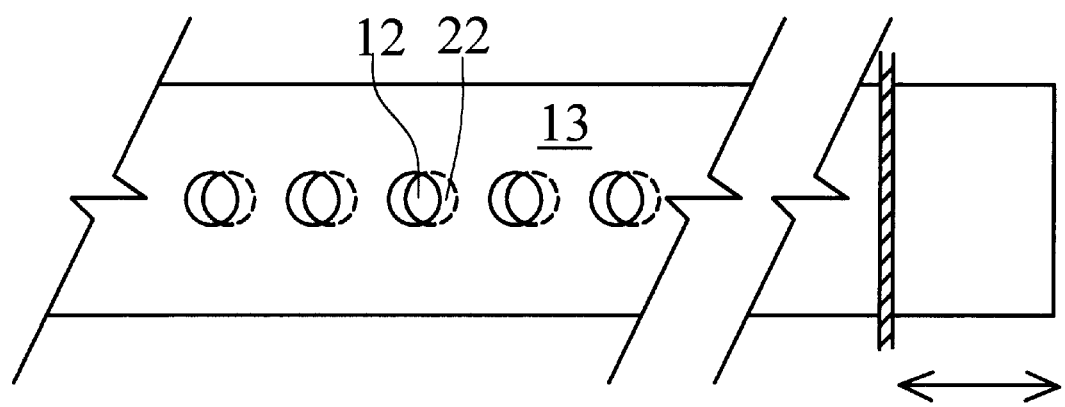
FIG. 4 is a full scale plan view of the spreader openings and slide control.
Figure 5:
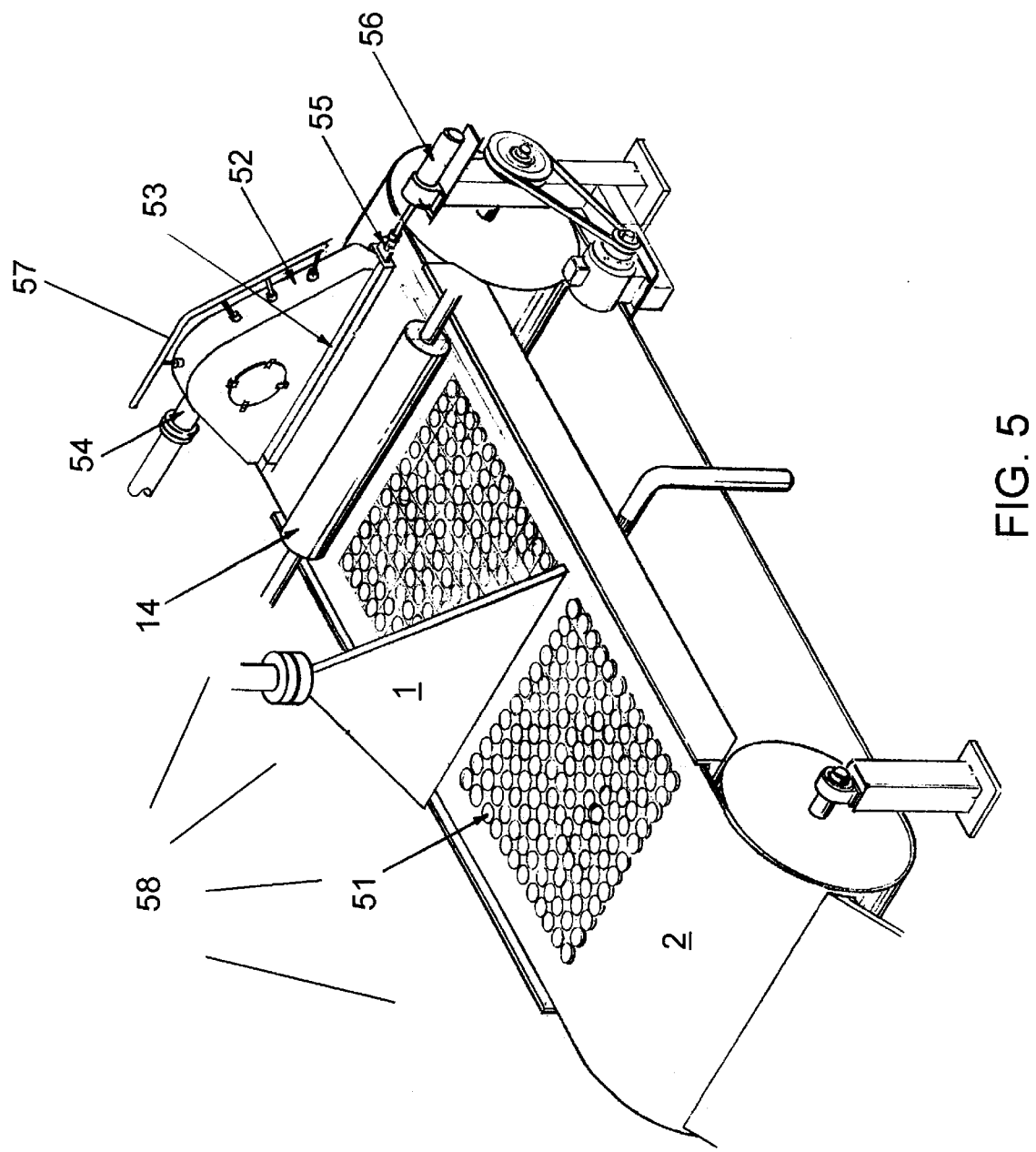
FIG. 5 illustrates the apparatus of FIG. 1, in an embodiment adapted for the purpose of irradiating food.
Figure 6:
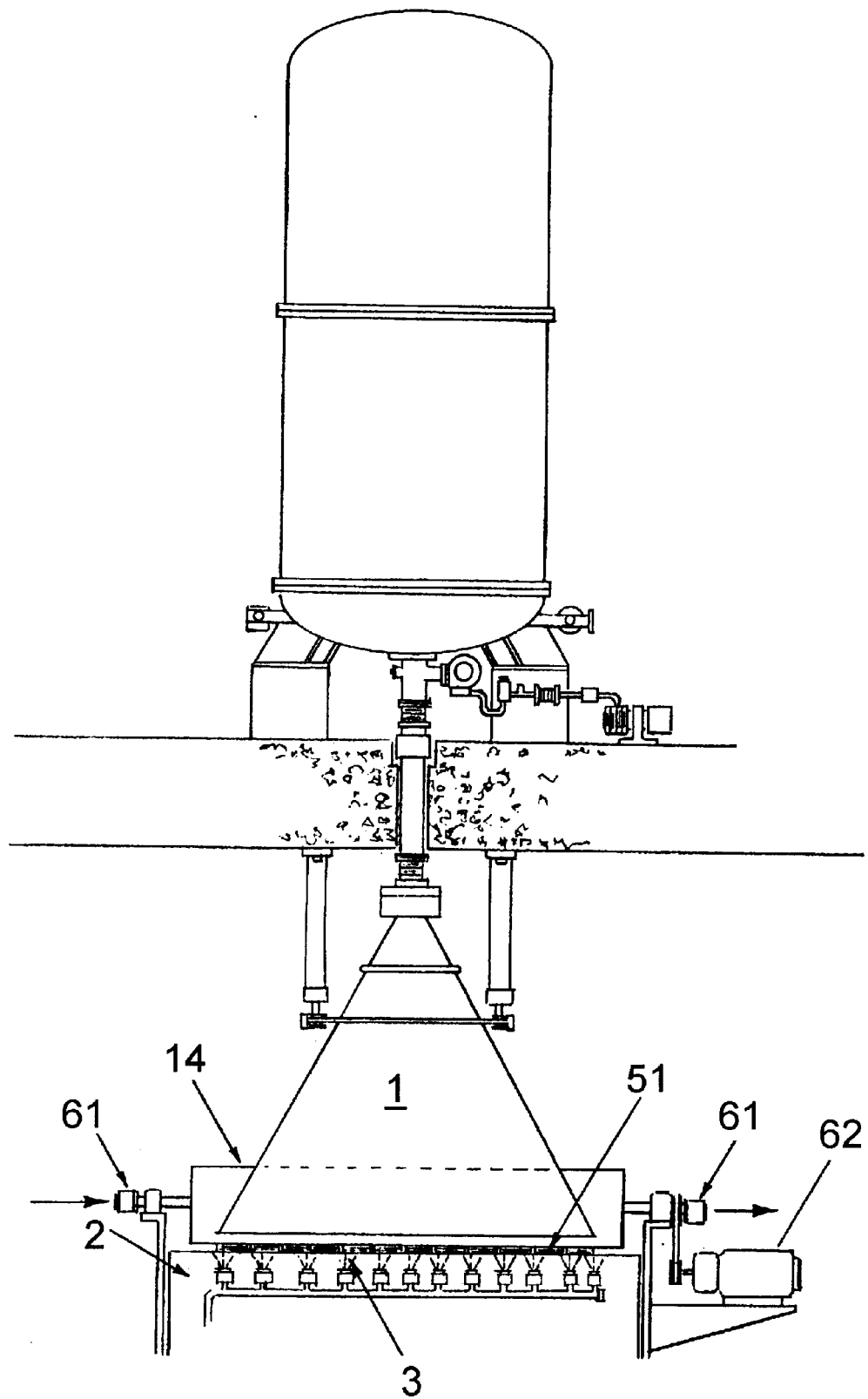
FIG. 6 is an end view of the embodiment of FIG. 5.

FIGS. 5 and 6 illustrates the apparatus of FIG. 1, adapted with means to enable bulk food irradiation. The embodiments of the invention used for food irradiation, as illustrated in FIGS. 5 through 9, are virtually identical to the embodiments of the invention described above in connection with FIGS. 1 through 4 for polymer chip irradiation. Electron beam accelerator (EBA) scan horn 1 and "endless" conveyor belt 2 bear the same operational relationships to one another as disclosed in connection with the discussion of FIGS. 1 through 4. The dimensions, materials (e.g., stainless steel preferred for belt 2) and all other aspects of the embodiments of FIGS. 1 through 4 apply equally to and are incorporated fully into the embodiments of FIGS. 5 through 9. As illustrated in FIG. 6, coolant jets 3 are similarly employed for cooling during the irradiation process.

The primary difference, is that the embodiments of FIGS. 5 through 9 are applied to the irradiation of food items 51 rather than of the polymer chips in chip bed 23. Structurally, this means that the various means of FIGS. 1 through 4 for delivering polymer chips into chip bed 23 upon conveyor belt 2 and for leveling and properly distributing these chips for irradiation are replaced by means for delivering food items 51 onto conveyor belt 2 and for leveling and properly distributing food items 51 onto conveyor belt 2 for irradiation. Additionally, this means that since food items, particularly meat products, certainly cannot tolerate temperatures approaching 400 degree Fahrenheit as can polymer chips, that the maximum temperature is now much lower, and that this lower temperature must be realized through various cooling means in the food processing embodiments of the invention.

While it is understood that food items 51 include any food item for which irradiation provides a suitable means for decontamination, FIG. 5 illustrates the particular application of the invention to ground meats such as hamburgers, loose (pre-wrapped) sausage meats, etc. Variations of this embodiment to apply to other meat or food products are considered to be an anticipated and obvious extension of this disclosure, and to be within the scope of the associated claims.

FIGS. 5 and 6 particularly illustrate a meat hopper 52 which serves the same role in this embodiment, that was earlier served by chip feed hopper 7 in the embodiments of FIGS. 1 through 4. The illustrated pyramid shape for meat hopper 52 permits even distribution of the bulk ground meat so that a substantially even weights of meat are discharged (extruded) onto belt 2 through at least one meat passage aperture 53. Apertures 53 are hidden in FIG. 5, but are illustrated and discussed in FIG. 8. In this embodiment, the meat is extruded through the at least one meat passage aperture 53 in a round "blob." Then, as belt 2 conveys the ground meat toward scan horn 1, leveling means 14 in this embodiment is a food roller rather than the earlier-illustrated chip leveling bar. Food items 51—in this illustration the ground meat patties leveled and flattened by leveling means 14—are then passed at least once past scan horn 1 while being cooled via coolant jets 3, all as earlier described. Once the irradiation is complete, belt 2 is then moved such that food items 51 are removed from belt 2 and into a food collector such as the earlier-illustrated chip collector 19.

FIG. 5 also illustrates bulk food feed 54 through which ground meat is injected under suitable pressure into meat hopper 52. Bulk food feed 54 is preferably about 4 inches in diameter, but can range anywhere from 1 inch to over 12 inches, and can be driven by, for example, a screw-type or piston-type feed, not shown. FIG. 5 also illustrates meat cutter 55 to be further discussed below in connection with FIG. 9, and cutter driving means 56 such as a piston for driving meat cutter 55. FIG. 6 also illustrates a variable speed drive means 62 for driving conveyor belt 2.

Further, in contrast to the embodiment of FIGS. 1 through 4, where cleaning and sterilization are not of any great concern, it is very important that the embodiment of FIGS. 5 through 9 be properly cleaned and sterilized between uses. Thus, steam jets 57 are used to clean and sterilize meat hopper 52 between uses by blasting steam inside of meat hopper 52 and heating meat hopper 52 to a temperature enabling sterilization. FIG. 6 also illustrates rotating couplings 61 used to pass steam, or water of any desired temperature including chilled water, through the food roller embodiment of leveling means 14. The food roller in its preferred embodiment is substantially hollow, so that while food items 51 are being irradiated, chilled water can be passed therethrough to aid in cooling food items 51. Then, between uses, hot steam is passed through the food roller, which aids in cleaning and sterilizing the food roller. Again, sterilization occurs because of the elevated temperature induced by the steam. Further, in these food irradiation embodiments of the invention, coolant jets 3 are optionally additionally fitted with means to generate steam, and thus are coolant and steam jets 3. Then, similarly to the food roller, jets 3 are used to cool the food items 51 on belt 2 during use, and are used to blast steam on the underside of belt 2 between uses so that belt 2 can be heated to a temperature that kills and eliminates any residual bacteria and contaminants.

Figure 7:
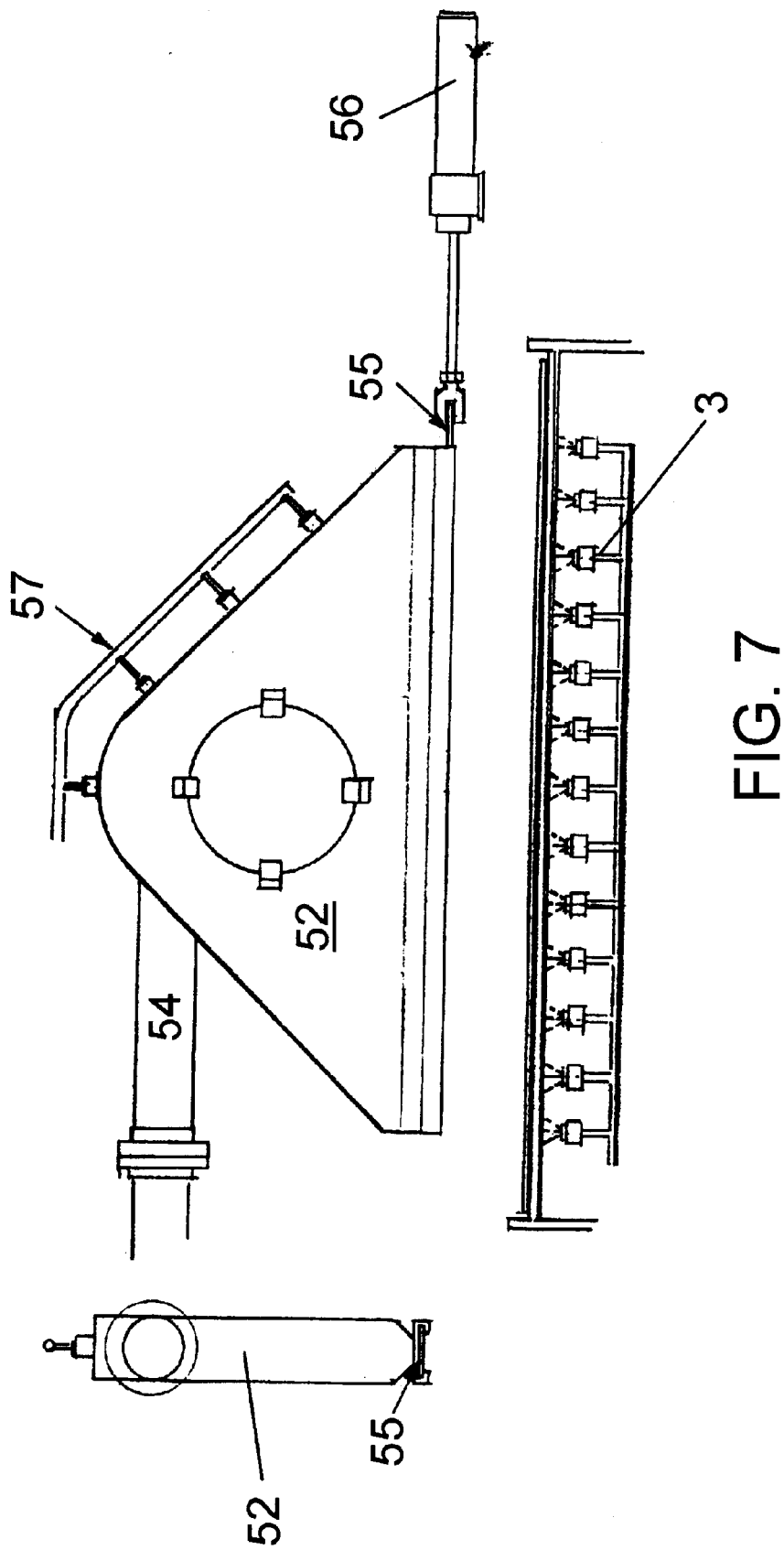
FIG. 7 illustrates front and side views of the meat hopper contained in FIG. 5.
Figure 8:
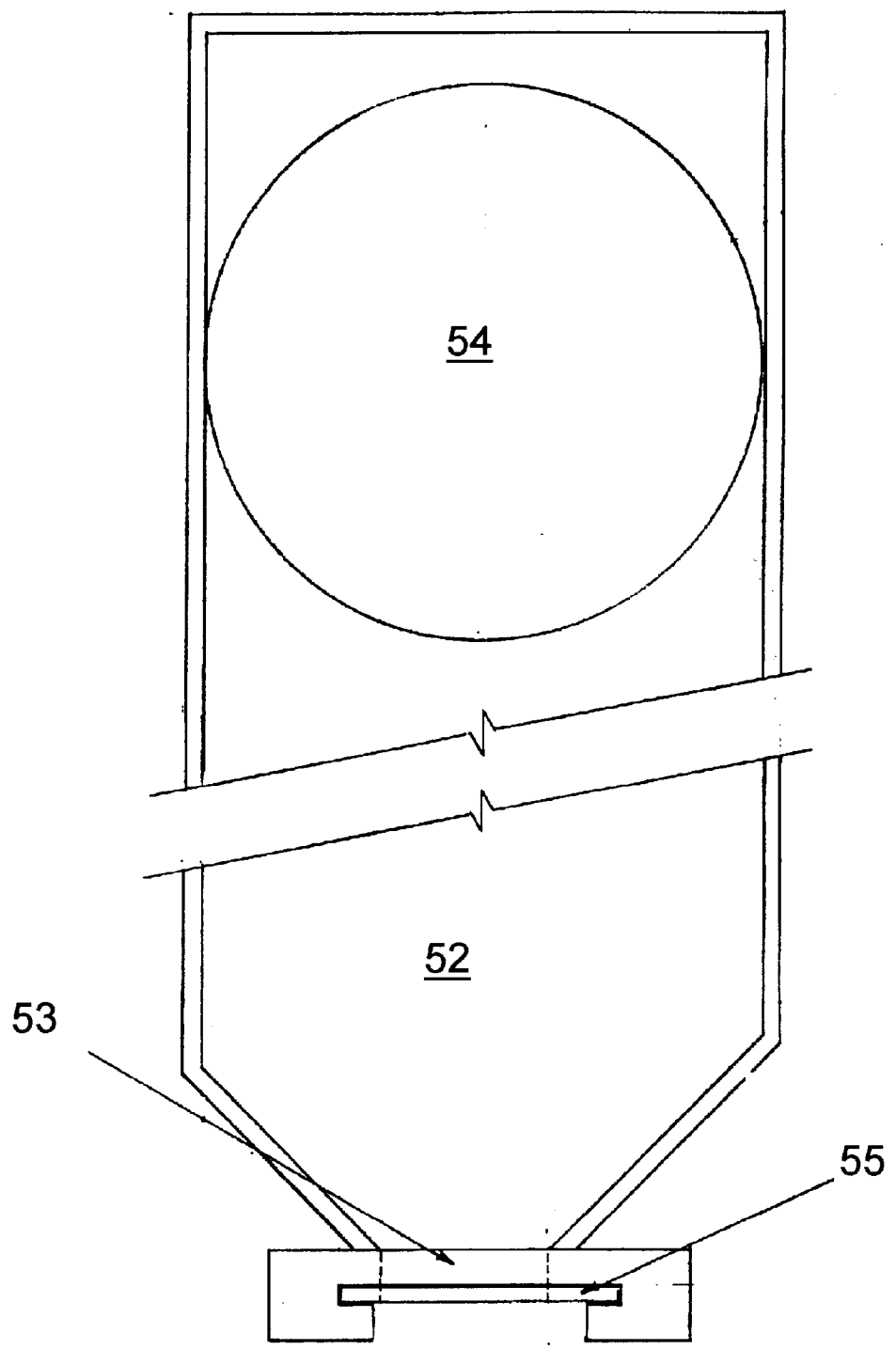
FIG. 8 in an enlargement of the meat hopper side view of FIG. 7.

FIG. 7 illustrates meat hopper 52 with all of its aforementioned elements in further detail, and FIG. 8 expands the side view of hopper 52 in further detail.

Figure 9:
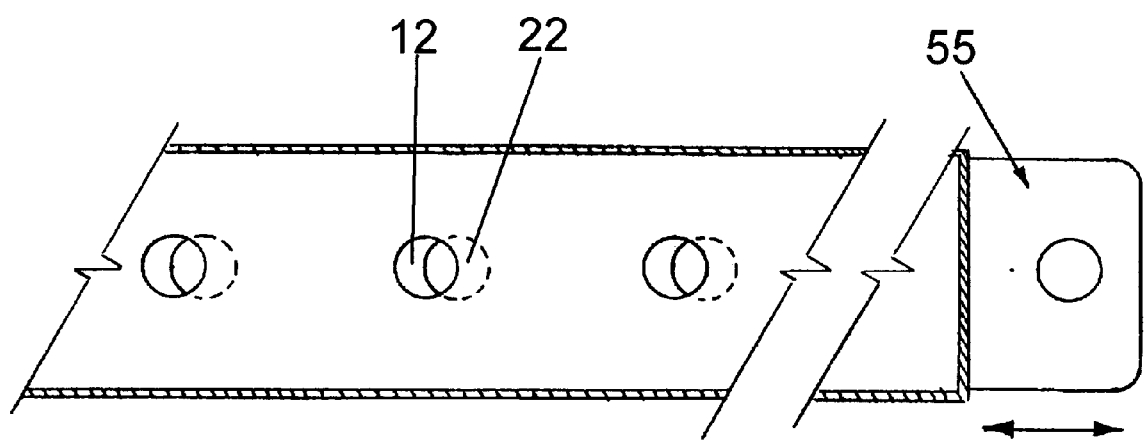
FIG. 9 is a plan view further illustrating the meat cutter contained in FIG. 5.

FIG. 9 illustrates meat cutter 55, which serves a function similar to flow rate slide 13 of FIG. 4. Similarly to flow rate slide 13, meat cutter 55 comprises hopper apertures 12 and slide apertures 22. However, hopper apertures 12 and slide apertures 22 in this embodiment are larger—typically about 1 inch but anywhere between 0.25 inches and 4 inches—so as to enable the ground meat to be squeezed therethrough from meat hopper 52 onto belt 2. Additionally, flow rate slide 13 of FIG. 4 is opened to a particular flow rate setting, so that polymer chips can then continuously flow therethrough at a desired rate. In the food irradiation embodiment of FIGS. 5 through 9, meat cutter 55 is moved back and forth by cutter driving means 56 in the direction indicated by the two-headed arrow, so as to cut the meat being pressed through hopper apertures 12 and slide apertures 22 on a regular, periodic basis. The combination of the magnitude of pressure applied to the meat via bulk food feed 54, the sizes of hopper apertures 12 and slide apertures 22, and the periodic timing at which meat cutter 55 is moved into a closed position to cut the meat flow and then reopened to start a new meat flow, is determined such that a predetermined, desired quantity or weight of meat is pressed out of meat hopper 52 as the round "blob," to then be pressed by leveling means 14—in this embodiment the food roller—into meat patties. Analogously to chip bed 23 of FIGS. 1 through 4, the term "food bed" will be used generally to describe food items 51 once these have been flattened or otherwise suitably prepared for movement past scan horn 1 for irradiation.

Preferably, the meat takes the form of patties about 4 inches in diameter once flattened, but this can range anywhere from 1 inch to 12 inches or more. In alternative embodiments not illustrated, ground meats can also be pressed out into "blobs" on belt 2 and flattened using a vertical die similar to that used in cookie cutters known in the art, or using a rotating die similar to wallpaper rollers known in the art. If bulk meat processing is desired and meat patties are not an essential end product, the ground meat can also simply be extruded, for example, through a single elongated slot in meat hopper 52, and then flattened into a continuous bed of meat similar in appearance to the chip bed 23 of FIG. 1. And, since there are numerous ways known in the art to handle and deliver bulk quantities of food for various types of processing and packaging functions, it is understood that any food delivery apparatus, system or method known in the art that enables bulk quantities of food to be delivered onto a flat surface such a conveyor belt similar to belt 2 for handling and processing, when used in combination with the overall irradiation apparatus and method taught according to the present invention, is considered to be within the scope of this disclosure and its associated claims.

For food items, particularly meats, it is necessary to maintain the temperature at meat packing refrigeration levels, so that the food is not cooked by the irradiation process. This is in contrast to polymer chips which for which the maximum temperature is close to 400 degrees Fahrenheit. Thus, in addition to using coolant jets 3 to cool the underside of belt 2 and hence the food items 51 thereon, it is desirable in this embodiment for the ambient environment surrounding belt 1 to also be appropriately refrigerated using environmental refrigeration means schematically represented by 58 in FIG. 5. Because the belt dimensions as outlined earlier can be kept relatively small, the space that needs to be refrigerated can also be kept small, thereby keeping the costs low.

As noted earlier, the various parameters of this apparatus and method need to be considered, and for food processing, may vary somewhat from the corresponding parameters used for polymer chip irradiation. This is particularly the case regarding the need to maintain temperatures at suitable meat packing refrigeration levels when the food items 51 are meats. Again, for example, the speed at which food items 51 are moved past scanner horn 1, the number of passes, the length and depth the distribution of food items 51 on belt 2, the strength of the radiation, and the heat-exchange capacity of the coolant, can all be adjusted depending upon the particular food to be processed, the degree of radiation needed, and the desired maximum temperature. Thus, for example, a slower conveyance speed will tend to heat the food more rapidly, which in turn may increase the cooling requirements. Similarly, for a thicker bed of food, there will be more variation between the food temperature higher in the bed and lower in the bed, since the lower food regions will be in closer contact with the coolant on the underside of the belt, and the environmental refrigeration means 58 may need to compensate for this. Or, a particular situation may demand more passes with greater conveyance speed so as to avoid too much heating, or may admit fewer passes with slower speed. In short, it is to be understood that processing situations may vary from one another as between polymer chips and food items, and as among various different food items, and that the parameters for speed, number of passes, bed length, food bed depth, coolant type and method, etc., can be varied in an interrelated manner so as to meet the particular processing requirements. Thus, the various ranges for these parameters outlined herein are again simply guidelines that can be adjusted as needed within the spirit of this invention.

It is noted that the apparatus and method using the parameters particularly specified herein, for food processing, can irradiate and decontaminate 4-inch diameter ground meat patties at the rate of about 144 patties per minute, and that the costs associated therewith resolve to less than 1 cent per patty.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A method for radiation processing of food items, comprising the steps of:
   distributing said food items upon a top surface of a substantially flat conveyance means, into a substantially uniform food bed;
   irradiating said food items by passing said food bed proximate a radiation means, at least once, at a substantially constant rate of relative speed between said food bed and said radiation means; and
   cooling said food items during said irradiating to maintain a temperature of said food items below a predetermined maximum temperature, whereby:
      said radiation processing of said food items is performed rapidly yet uniformly and safely, while said food items are uniformly maintained below said predetermined maximum temperature.

2. The method of claim 1, wherein the relative direction of movement between said food bed and said radiation means is reversible, and wherein said step of irradiating said food items comprises passing said food bed proximate said radiation means, at least three times.

3. The method of claim 1, wherein said step of distributing said food items upon said conveyance means further comprises the steps of:
   depositing said food items using bulk food delivery means, onto said top surface of said conveyance means; and
   leveling the deposited food items into said substantially uniform food bed, at a predetermined food bed depth, using food bed leveling means.

4. The method of claim 1, wherein said food items comprise ground meats.

5. The method of claim 1, wherein said predetermined maximum temperature is substantially a suitable refrigeration temperature for meat packing.

6. The method of claim 3, wherein said food items comprise ground meats, and wherein said step of depositing the food items from said bulk food delivery means onto said top surface of said conveyance means further comprises:
   injecting said ground meat, under suitable pressure, into a meat hopper; and
   thereby extruding said ground meat through at least one meat passage aperture of said meat hopper, onto said top surface of said conveyance means.

7. The method of claim 3, wherein said food items comprise ground meats, and wherein said step of leveling the deposited food items into said substantially uniform food bed further comprises:
   substantially flattening the deposited food items by passing said deposited food items under a food roller.

8. The method of claim 1, wherein said step of cooling said food items upon said top surface of said substantially flat conveyance means, comprises at least one of the further cooling steps selected from the cooling step group consisting of:
   applying cooling means to an undersurface of said conveyance means; and
   passing cooling means through leveling means used to level said food items into said substantially uniform food bed; and
   cooling an ambient environment proximate said conveyance means using environmental refrigeration means.

9. The method of claim 1, further comprising at least one cleaning and sterilization step selected from the cleaning and sterilization step group consisting of:
   applying steam to said conveyance means, when said conveyance means does not have said food items upon said top surface thereof; and
   passing steam through leveling means used to level said food items into said substantially uniform food bed, when said leveling means is not being used to so-level said food items; and
   passing steam through bulk food delivery means so-distributing and depositing said food items onto said top surface of said conveyance means, when said bulk food delivery means is not being used to so-deliver and deposit said food items onto said top surface of said conveyance means.

10. The method of claim 1, wherein said step of distributing said food items upon said conveyance is selected from the food distribution step group consisting of:
    depositing said food items onto said conveyance means using a vertical dye; and
    depositing said food items onto said conveyance means using a rotating dye.

11. The method of claim 1, further comprising automatically collecting food items that have been irradiated by said apparatus, using automated food item collection means.

12. The method of claim 1, wherein said conveyance means is fabricated from a material which can be subjected to repeated radiation exposure over time without substantial degradation; which is sufficiently flexible to be fashioned into an endless conveyor belt; and which is sufficiently heat-conductive to facilitate so-cooling said food items by so-cooling said undersurface of said conveyance means.

13. The method of claim 1, wherein said conveyance means is an endless conveyor belt.

14. An apparatus for radiation processing of food items, comprising:
    substantially flat conveyance means;
    food item distribution means for distributing said food items upon a top surface of said conveyance means, into a substantially uniform food bed;
    radiation means for irradiating said food items by passing said food bed proximate said radiation means, at least once, at a substantially constant rate of relative speed between said food bed and said radiation means; and
    cooling means cooling said food items during said irradiating to maintain a temperature of said food items below a predetermined maximum temperature, whereby:

said radiation processing of said food items is performed rapidly yet uniformly and safely, while said food items are uniformly maintained below said predetermined maximum temperature.

15. The apparatus of claim 14, wherein the relative direction of movement between said food bed and said radiation means is reversible, and wherein said food bed is passed proximate said radiation means, at least three times.

16. The apparatus of claim 14, wherein said distribution means further comprises:

bulk food delivery means depositing the food items onto said top surface of said conveyance means; and food bed leveling means leveling the deposited food items into said substantially uniform food bed, at a predetermined food bed depth.

17. The apparatus of claim 14, wherein said food items comprise ground meats.

18. The apparatus of claim 14, wherein said predetermined maximum temperature is substantially a suitable refrigeration temperature for meat packing.

19. The apparatus of claim 16, wherein said food items comprise ground meats, and wherein said bulk food delivery means further comprises:

a meat hopper further comprising at least one meat passage aperture; and bulk food feed means injecting said ground meat, under suitable pressure, into said meat hopper and thereby extruding said ground meat through said at least one meat passage aperture onto said top surface of said conveyance means.

20. The apparatus of claim 16, wherein said food items comprise ground meats, said food bed leveling means further comprising:

a food roller substantially flattening the deposited food items by passing said deposited food items under said food roller.

21. The apparatus of claim 14, said cooling means further comprising at least one of the further cooling means selected from the cooling means group consisting of:

cooling jets applying coolant to an undersurface of said conveyance means; and coolant passage means for passing coolant through leveling means used to level said food items into said substantially uniform food bed and thereby cooling said food items contacting said leveling means; and environmental refrigeration means cooling an ambient environment proximate said conveyance means.

22. The apparatus of claim 14, further comprising at least one means for cleaning and sterilizing said apparatus when said apparatus is not being used to irradiate said food items, selected from the cleaning and sterilization means group consisting of:

steam-to-conveyance application means for applying steam to said conveyance means; and steam-through-level passage means for passing steam through leveling means used to level said food items into said substantially uniform food bed; and steam jet means for passing steam through bulk food delivery means so-distributing and depositing said food items onto said top surface of said conveyance means.

23. The apparatus of claim 14, wherein said food distribution means is selected from the food distribution means group consisting of:

a vertical die depositing said food items onto said conveyance means; and a rotating die depositing said food items onto said conveyance means.

24. The apparatus of claim 14, further comprising automated food item collection means for automatically collecting food items that have been irradiated by said apparatus.

25. The apparatus of claim 14, wherein said conveyance means is fabricated from a material which can be subjected to repeated radiation exposure over time without substantial degradation; which is sufficiently flexible to be fashioned into an endless conveyor belt; and which is sufficiently heat-conductive to facilitate so-cooling said food items by so-cooling said undersurface of said conveyance means.

26. The apparatus of claim 14, wherein said conveyance means is an endless conveyor belt.

* * * * *